US010657410B2

(12) United States Patent
Hilbert et al.

(10) Patent No.: US 10,657,410 B2
(45) Date of Patent: May 19, 2020

(54) METHOD AND SYSTEM FOR ABNORMAL TISSUE DETECTION USING Z-SCORES IN A JOINT HISTOGRAM

(71) Applicant: SIEMENS HEALTHCARE GMBH, Erlangen (DE)

(72) Inventors: Tom Hilbert, Lausanne (CH); Tobias Kober, Lausanne (CH); Gian Franco Piredda, Ecublens (CH)

(73) Assignee: Siemens Healthcare GmbH, Erlangen (DE)

( * ) Notice: Subject to any disclaimer, the term of this patent is extended or adjusted under 35 U.S.C. 154(b) by 222 days.

(21) Appl. No.: 15/952,278

(22) Filed: Apr. 13, 2018

(65) Prior Publication Data

US 2019/0318197 A1 Oct. 17, 2019

(51) Int. Cl.
*G06K 9/00* (2006.01)
*G06K 9/62* (2006.01)
(Continued)

(52) U.S. Cl.
CPC ......... *G06K 9/6212* (2013.01); *G06K 9/6298* (2013.01); *G06T 7/0014* (2013.01);
(Continued)

(58) Field of Classification Search
CPC . G06T 2207/10088; G06T 2207/30016; G06T 2207/20128; G06T 7/0014; G06T 7/174; G06K 9/6212; G06K 9/6298
See application file for complete search history.

(56) References Cited

U.S. PATENT DOCUMENTS

2006/0257027 A1* 11/2006 Hero ................. G06K 9/627
382/190
2008/0292194 A1* 11/2008 Schmidt ............ G06T 7/0012
382/217
(Continued)

OTHER PUBLICATIONS

Bernarding, J., et al. "Histogram-based characterization of healthy and ischemic brain tissues using multiparametric MR imaging including apparent diffusion coefficient maps and relaxonnetry." Magnetic Resonance in Medicine: 43.1 (2000): 52-61. (Year: 2000).*
(Continued)

*Primary Examiner* — Li Liu
(74) *Attorney, Agent, or Firm* — Laurence Greenberg; Werner Stemer; Ralph Locher (57) ABSTRACT

Organ tissue properties of a patient are automatically compared with organ tissue properties of a healthy subject group. A population norm for the organ tissue properties is determined by: selecting at least two different tissue properties of the organ; determining for each tissue property previously selected and for each subject of said group a quantitative tissue property map; for each subject of the group, calculating a joint histogram from all the quantitative tissue property maps obtained for said subject; and determining an averaged joint histogram from all subjects of the healthy group, thus defining the population norm. A comparison is automatically performed of the averaged joint histogram with a patient joint histogram obtained for the organ tissue properties of the patient, by calculating a statistical deviation of values of a patient joint histogram relative to values of the averaged joint histogram, and mapping the statistical deviation to the patient organ.

11 Claims, 5 Drawing Sheets

(51) Int. Cl.
  *G06T 7/00* (2017.01)
  *G06T 7/11* (2017.01)
  *G06T 7/174* (2017.01)
(52) U.S. Cl.
  CPC ............... *G06T 7/11* (2017.01); *G06T 7/174* (2017.01); *G06T 2207/10088* (2013.01); *G06T 2207/20128* (2013.01); *G06T 2207/30016* (2013.01)

(56) References Cited

U.S. PATENT DOCUMENTS

| | | | | |
|---|---|---|---|---|
| 2013/0101189 | A1* | 4/2013 | Robitaille | G01R 33/5608 382/128 |
| 2013/0137966 | A1* | 5/2013 | Nakahara | A61B 5/055 600/411 |
| 2013/0329973 | A1* | 12/2013 | Cao | A61B 5/0033 382/128 |
| 2016/0210749 | A1* | 7/2016 | Nguyen | A61B 5/00 |
| 2017/0103287 | A1* | 4/2017 | Han | G06T 5/00 |
| 2019/0362522 | A1* | 11/2019 | Han | G01R 33/4812 |

OTHER PUBLICATIONS

Faria, Andreia V., et al. "Quantitative analysis of brain pathology based on MRI and brain atlases—applications for cerebral palsy." Neuroimage 54.3 (2011): 1854-1861. (Year: 2011).*

Young et al., "Comparison of Region-of-Interest Analysis With Three Different Histogram Aanalysis Methods in the Determination of Perfusion Metrics in Patients With Brain Gliomas", Journal of Magnetic Resonance Imaging 26: 1053-1063 (2007).

Baudrexel et al., "Quantitative mapping of T1 and T2* discloses nigral and brainstem pathology in early Parkinson's disease", NeuroImage, 51(2010) 512-520.

Deoni, "Whole-Brain Voxel-Wise Analysis of Myelin Water vol. Fraction in Multiple Sclerosis",Proceedings of 17th Annual Meeting of the ISMRM; Hawaii USA, 2009, p. 162.

* cited by examiner

METHOD AND SYSTEM FOR ABNORMAL TISSUE DETECTION USING Z-SCORES IN A JOINT HISTOGRAM

BACKGROUND OF THE INVENTION

Field of the Invention

The present disclosure is directed, in general, to tissue macrostructure and microstructure visualization in magnetic resonance imaging (MRI), and more specifically to the detection of abnormal tissue by means of MRI techniques.

MRI is a technique that offers a wide variety of contrasts and has proved to deliver excellent soft tissue contrast containing essential clinical information, which has enabled its broad clinical use today. The contrast apparent in classical magnetic resonance (MR) images is the result of a combination of different physical parameters of the underlying tissue and the particular acquisition technique—i.e. the complicated mix of these factors determine the final contrast.

A different approach of acquiring information of biological tissue using MRI is to directly measure one or more of the underlying physical properties which are part of the mix determining classical image contrast. Those techniques are usually referred to as "parametric mapping" or "quantitative (magnetic resonance) imaging/qMRI" methods. Using this approach, the resulting parametric maps become more independent from the employed hardware, the applied imaging technique and the particular imaging parameters used. This facilitates comparability and thus clinical diagnosis and may enable building up databases of normal parametric values to which a newly scanned patient dataset can be compared. In other words, it provides the means to move from relative contrast information depending on various factors to a single, absolute measure based on physical tissue properties.

Recently, fast quantitative MRI techniques have been established enabling their clinical use. However, these techniques may not have a real additional clinical value without knowing a normal range of the measured parameter in healthy tissue. In order to exploit the full clinical value of qMRI, databases of normative quantitative values in healthy tissue are required, which will allow for direct comparison of patient measurements to a healthy cohort. Once such databases are established, methods to compare individual subjects with the database are required to be able to detect non-normal, i.e. suspected pathological tissue. Comparisons can be classified into three categories with respect to their spatial coverage: whole-organ (e.g. whole-brain), regional (e.g. brain lobe by brain lobe) or voxel-wise comparisons. Furthermore, they can be divided into group- and single-subject comparisons.

In group comparison studies, statistically relevant differences between a cohort of patients and healthy subjects show whether the investigated pathology causes changes in organ tissue properties at all and indicates typically affected regions. Group comparisons have a high statistical power since an accumulation of samples from both healthy subjects and patients is used. However, no conclusions can be drawn for a single individual.

In contrast, to investigate abnormalities in a single subject with respect to a healthy control group, it has to be tested against "population norms", i.e. reference ranges of normal values. QMRI techniques are much better suitable for such a use case due to their above-mentioned independence of hardware, acquisition parameters and other influences. The healthy norm information is typically accumulated in a "normative organ atlas" (alternatively "reference organ atlas"), defining a norm value and a value distribution for a given region in the healthy organ. To compare individuals to this normative organ atlas, the individual patient organ has to be spatially normalized, registered and—depending on the use case—different tissues segmented to align the same regions correctly with the one of the normative atlas. Both generating a normative organ atlas and aligning a patient organ to it poses various technical challenges.

Lastly, since multiple tissue properties can be extracted with qMRI (e.g., T1 relaxation and T2 relaxation parameters), another problem arises from how to use this multi-parametric data to derive differences to a healthy cohort and how to present them to a radiological reader in a simple but informative way.

Although fast parametric mapping techniques have been established only recently, several comparison methods have already been proposed to address the previously mentioned problems:

Histogram-based methods allow detecting tissue alterations indicated by pathologic changes of a tissue property (e.g. T2 in brain tissues) in group-wise comparison studies. Such a technique is for instance described in the paper of Young et al., entitled "Comparison of region-of-interest analysis with three different histogram analysis methods in the determination of perfusion metrics in patients with brain gliomas" (J. Magn. Reson. Imaging. 2007; 26: 1053-1063). These techniques are based on the idea to compare value distributions across a region of interest instead of point-by-point correspondences. This approach is typically comprised of the following steps: for each subject in the study, the region of interest is extracted (e.g. skull-stripping or total-intracranial-volume extraction in the brain). Then, the interval between the minimum and the maximum quantitative values over all voxels is divided into equally-spaced bins. Subsequently, the number of voxels whose values lie within the range of a bin is counted (i.e. a value histogram is generated). Afterwards, the voxel count in each bin is divided by the total number of voxels in the region of interest in order to normalize for global differences in size of the extracted region. After histograms are derived for each subject in the study, they are averaged across patients and healthy cohort, respectively, and then compared visually and statistically. Typical metrics that describe the averaged histogram distributions (mean, standard deviation, median, mode, peak height and location, among others) are tested to check for significant differences in a group-wise comparison.

Histogram-based methods can be applied at different scales, i.e. different sizes of the region of interest:

Global: the histogram is evaluated for the whole organ or body region. It is sensitive to large-scale tissue changes, but lacks spatial information. Furthermore, it shows not only tissue alterations but also if the concentration of a tissue type in the organ/body part is different (e.g. more cerebrospinal fluid and less grey matter in the brain);

Region-wise: the histogram is evaluated in specific organ/body part sub-regions (e.g. white matter, grey matter, cerebrospinal fluid, thalamus, etc. in case of the brain). In addition to the ROI extraction, tissue segmentation (manual or automatic) is required. That also means that segmentation errors will be directly reflected in the results, yet providing spatially localized results. Nevertheless, even in this case, it is not possible to reach spatial information at the voxel level.

Voxel-based methods involve a voxel-wise comparison of the investigated tissue property between a patient and a control group. Such a method is for instance described in the paper of Baudrexel et al., entitled "Quantitative mapping of T1 and T2* discloses nigral and brainstem pathology in early Parkinson's disease" (NeuroImage. 2010; 51(2): 512-520). According to this method, each voxel is treated as an independent region-of-interest. In order to perform a voxel-wise comparison, spatial normalization of patient and control image data into a common space is required after performing the ROI/organ/body part extraction. This is usually followed by smoothing of the images (i.e. application of a local average filter kernel) to improve statistical power. Mean and standard deviation of the quantitative tissue property are calculated across all subjects and patients for each voxel. Subsequently, voxel-wise statistical tests are performed in order to identify voxels where the groups significantly differ. Usually, due to the multiple repetitions of the statistical test, appropriate corrections for multiple comparisons (e.g. Bonferroni correction) are required. The common output of the method is a statistical map showing voxels where tissue properties differ among the groups. With respect to the previous approach, the results have a higher spatial resolution.

The main disadvantage of the voxel-based method is the volume differences in different anatomical structures across subjects. Therefore, the performance is highly dependent on the accuracy of the nonlinear registration required for spatial normalization. This is a challenging task since pathology may result in hyper- or hypo-intensities which may be erroneously recognized as anatomical structures and hence mislead the registration.

Another method for solving the above-mentioned problems is the single-subject comparison with population norms, as described for instance in the paper of Deoni entitled "Whole-brain Analysis of Myelin Content in Multiple Sclerosis" (Proceedings of 17th Annual Meeting of the ISMRM; Hawaii USA. 2009. P. 162). In a variety of disorders, group-wise comparisons are not suitable to detect pathological tissue. For instance, in diseases causing focal lesions randomly distributed in the tissue (e.g. multiple sclerosis in the brain), a voxel-wise group comparison is inappropriate due to the random location of lesions, while histogram-based approaches are more suitable but lack the required spatial information. In this case, performing a subject-specific analysis, comparing each individual subject with a healthy population is a better approach. Similar to group-wise comparisons, the population mean and standard deviation can be determined from spatially normalized control data from healthy subjects. Subsequently, the two previous discussed methods can be used to identify regions or voxels that substantially differ from the population norm. Prominent applications for such an approach in brain imaging are, besides multiple sclerosis, stroke or cancer, which also manifest themselves through lesions/metastasis at random locations.

BRIEF SUMMARY OF THE INVENTION

An objective of the present invention is to propose an efficient method and system for detecting a difference between a tissue of a patient's organ and a reference tissue, wherein said difference might be used by a radiological reader as an indication of a possible pathology of the tissue of the patient. This objective is achieved by a system and a method for performing a subject-specific comparison between a patient and a healthy population based on multiple parametric maps. Said subject-specific comparison advantageously provides additional information that can be used by the radiological reader for helping or supporting a diagnostic decision taking.

Various disclosed embodiments include methods and corresponding systems and computer readable mediums for automatically performing a subject-specific comparison between a patient and a healthy population based on multiple parametric maps. A method includes generating and characterizing a joint histogram in order to compare tissue property of a single subject to a reference cohort and back-mapping z-scores from the joint histogram to a patient MRI image in order to spatially visualize tissue property differences.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Other features which are considered as characteristic for the invention are set forth in the appended claims.

Although the invention is illustrated and described herein as embodied in a method and system for abnormal tissue detection using z-scores in a joint histogram, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

Like reference numerals and symbols designate like and equivalent objects throughout the drawing.

DETAILED DESCRIPTION OF THE INVENTION

FIGS. 1 through 3I, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1:
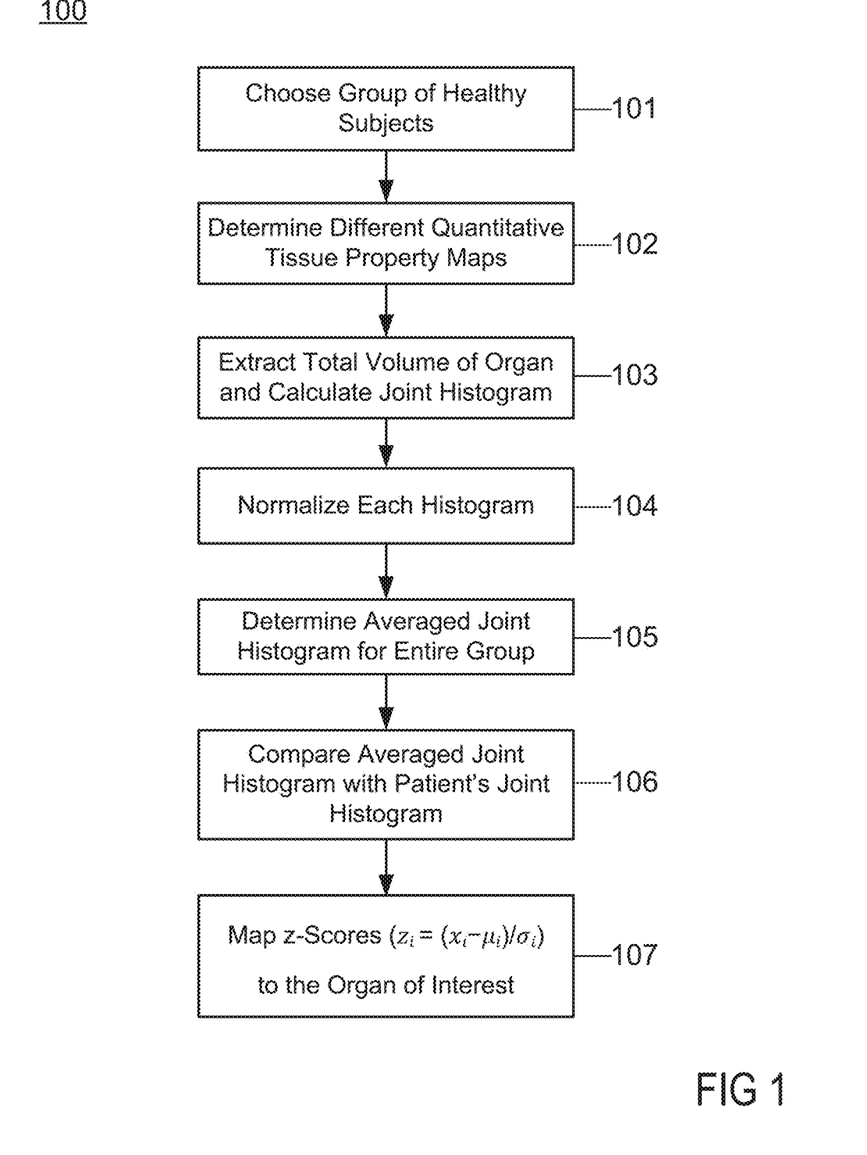
FIG. 1 illustrates a flowchart of a method according to the invention.
Figure 2:
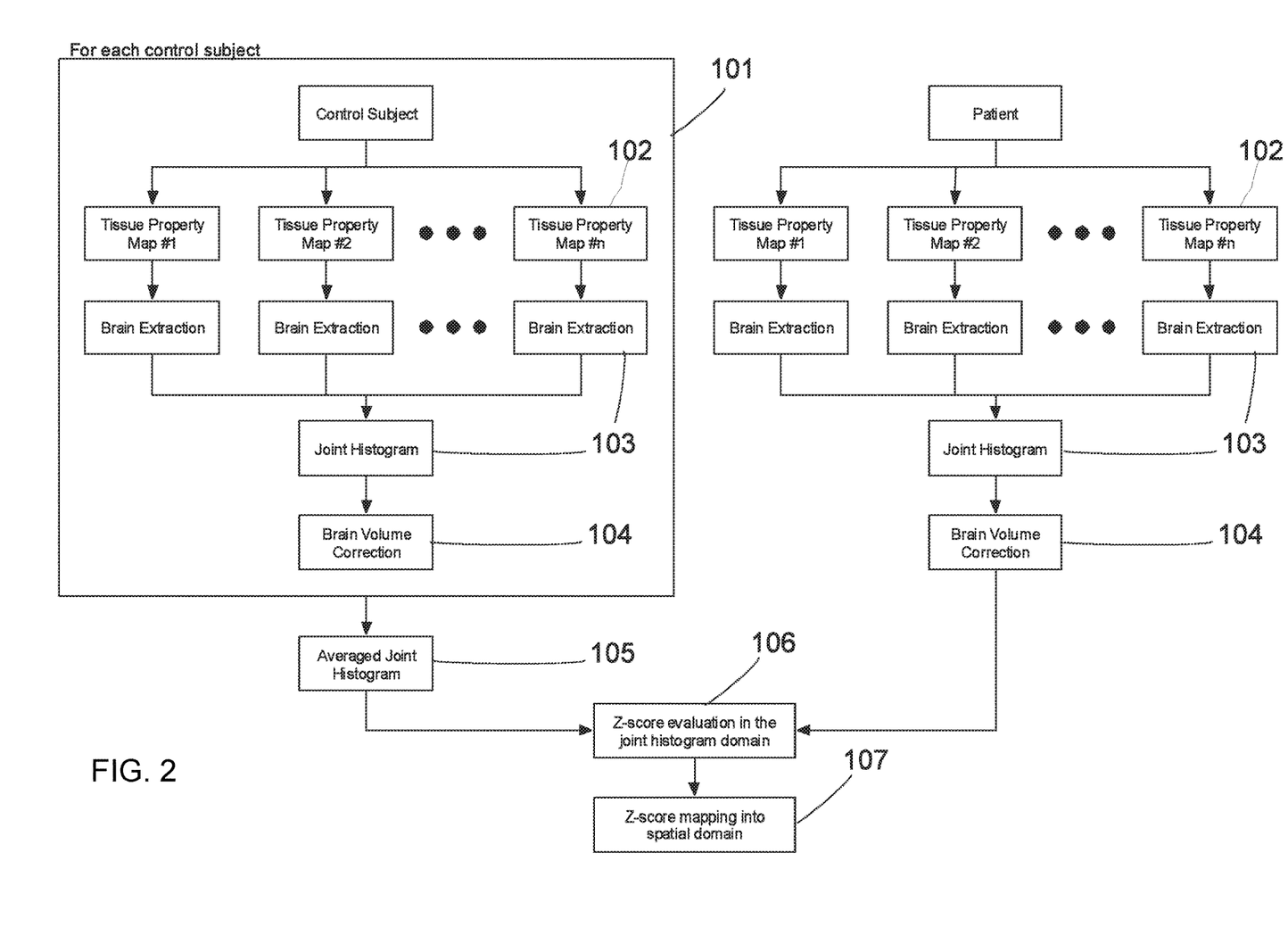
FIG. 2 illustrates another flowchart of a method according to the invention.

FIG. 1 discloses in more details a method for automatically comparing organ tissue properties of a patient, for instance for comparing organ sub-volumes tissue properties for said patient with organ tissue properties of a group of healthy subjects according to the concept of the invention. Said concept is also illustrated by means of FIG. 2 which takes over the reference numbers of FIG. 1 for a better comprehension of the invention. FIGS. 3A-3I show the different results obtained at the end of or during each step of the claimed method in the particular case of using T1 and T2 quantitative tissue property maps. Preferentially, the claimed method comprises the following steps which are preferentially performed by an imaging system or a data processing system comprising at least a memory and a processor:

At step 101, a healthy cohort, i.e. a group of healthy individuals or subjects, is chosen for determining a population norm for tissue properties of an organ in order to enable a detection of pathology of said organ. For each subject of the healthy cohort, at least the following steps 102-104 are performed as illustrated in FIG. 2.

Figure 3A:
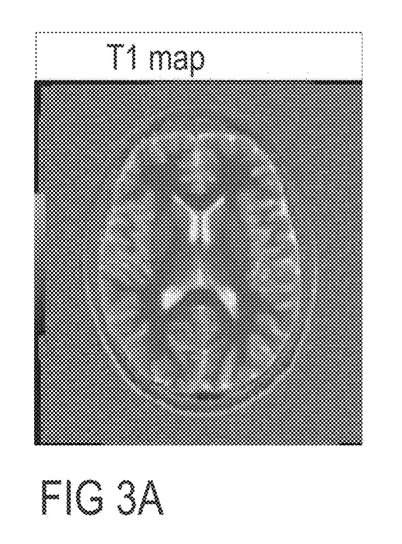
FIG. 3A-3I schematically illustrate the proposed method applied on brain T1 and T2 property maps and the resulting mapping of z-scores into the image domain for T1 and T2 property maps.
Figure 3B:
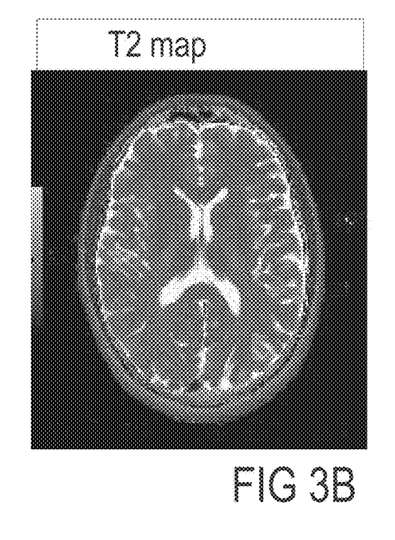

At step 102, at least two different quantitative tissue property maps are determined for each subject in the healthy cohort. The kind of quantitative tissue property map, e.g., T1, T2, Proton Density, Magnetization Transfer, etc., usually depends on the investigated pathology. According to the present invention, for each subject in the healthy cohort, the number n and the kind of quantitative tissue property maps determined for each subject is the same for all subjects of the healthy cohort. FIGS. 3A and 3B show for instance respectively a T1 map and a T2 map obtained for one of the subjects of the healthy cohort. The same kind of maps is then determined for each subject of the healthy cohort.

At step 103, for each subject of the healthy cohort a total volume of the organ (for instance a brain as illustrated in FIG. 3A or 3B) for which the pathology has to be detected is extracted and a joint histogram is calculated. Preferably, for each quantitative property map, said total volume is divided into voxels, wherein each voxel has or is associated to a quantitative value for a tissue property as determined or obtained from the quantitative tissue property map. Preferentially and in order to calculate the joint histogram, the quantitative values of each of the quantitative tissue property maps are divided into bins (or ranges) and for each bin (or range) a number of voxels that lay within this bin (or range) of quantitative values are counted in order to create said joint histogram.

At step 104, and preferentially, each previously determined joint histogram is normalized to take account of variations of the organ total volume in the quantitative tissue property maps used for creating said joint histogram, wherein said normalization of the joint histogram is preferably obtained by dividing each bin by the total number of voxels comprised within the total volume of said organ, yielding bins corresponding to a concentration of a combination of tissue properties (e.g. T1 in the range 800-820 ms and T2 in the range of 60-65 ms) in percentage of the total volume. In other words, said concentration corresponds to a number of voxels within a predefined range of values divided by the total number of voxels when considering the combined tissue properties. In particular, the joint histogram presents on a same chart at least two different scales (also called "dimensions" hereafter), for instance a first scale showing normalized quantitative values for the tissue properties obtained from a first quantitative tissue property map and a second scale showing normalized quantitative values for the tissue properties obtained from a second quantitative tissue property map, wherein the total volume of the organ has been used for normalizing the joint histogram as previously described. Preferentially, the joint histogram may comprise n different dimensions, wherein each dimension shows normalized quantitative values obtained from a different quantitative tissue property map. For instance, n quantitative tissue property maps might be acquired for providing n sets of normalized quantitative values, each set being then associated to its corresponding dimension in the joint histogram.

Figure 3C:
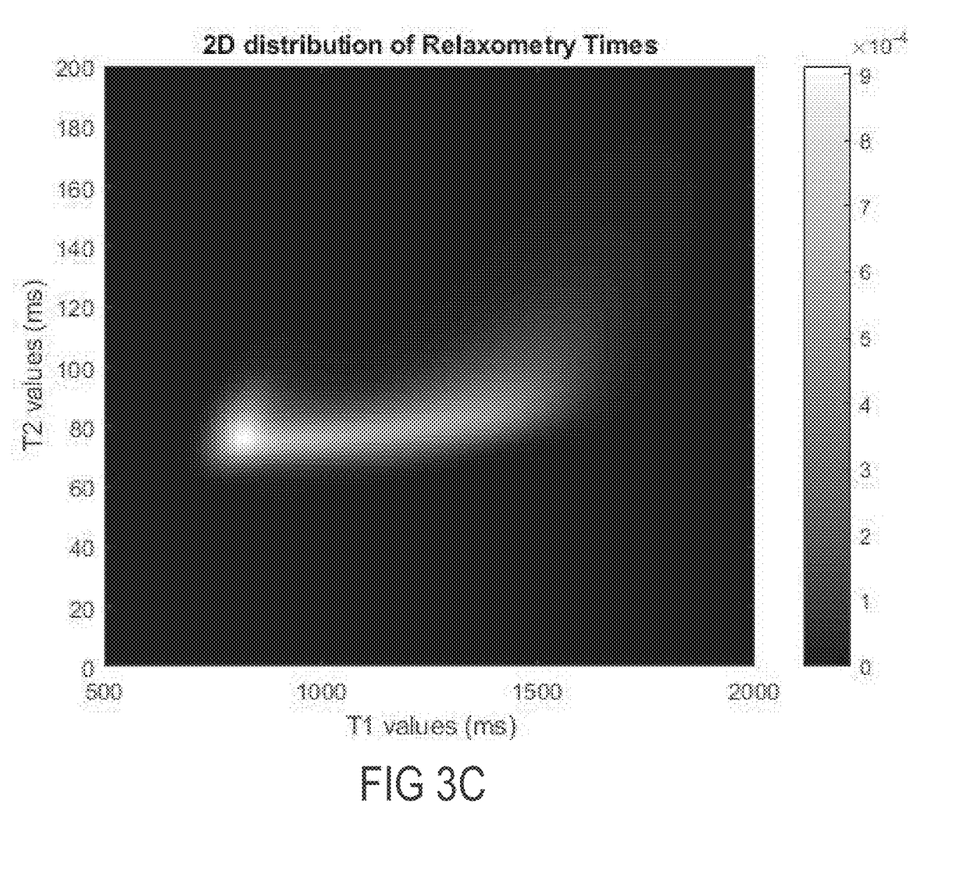

At step 105, the imaging system is configured for determining an averaged joint histogram by averaging the previously obtained joint histograms across all subjects of the healthy cohort. Such an averaged joint histogram is shown in FIG. 3C and has been obtained from the T1 map and T2 map presented in FIGS. 3A and 3B. Said averaged joint histogram (also called normative joint histogram) defines a "population norm" for the detection of said pathology for said organ: each $i^{th}$ bin of the averaged joint histogram is preferentially characterized by a mean value ($\mu_i$) and a standard deviation ($\sigma_i$) describing the concentration of tissue property combinations for the organ with respect to the healthy cohort.

Figure 3D:
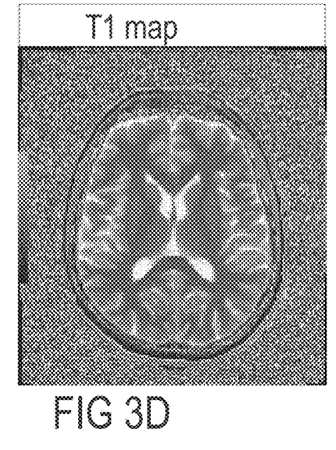
Figure 3E:
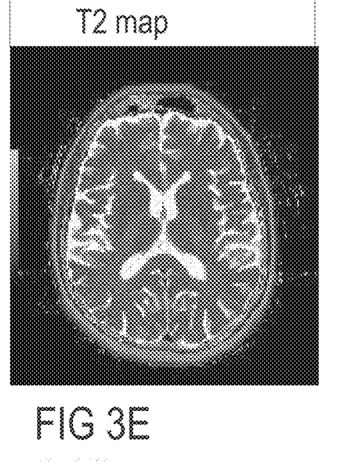
Figure 3F:
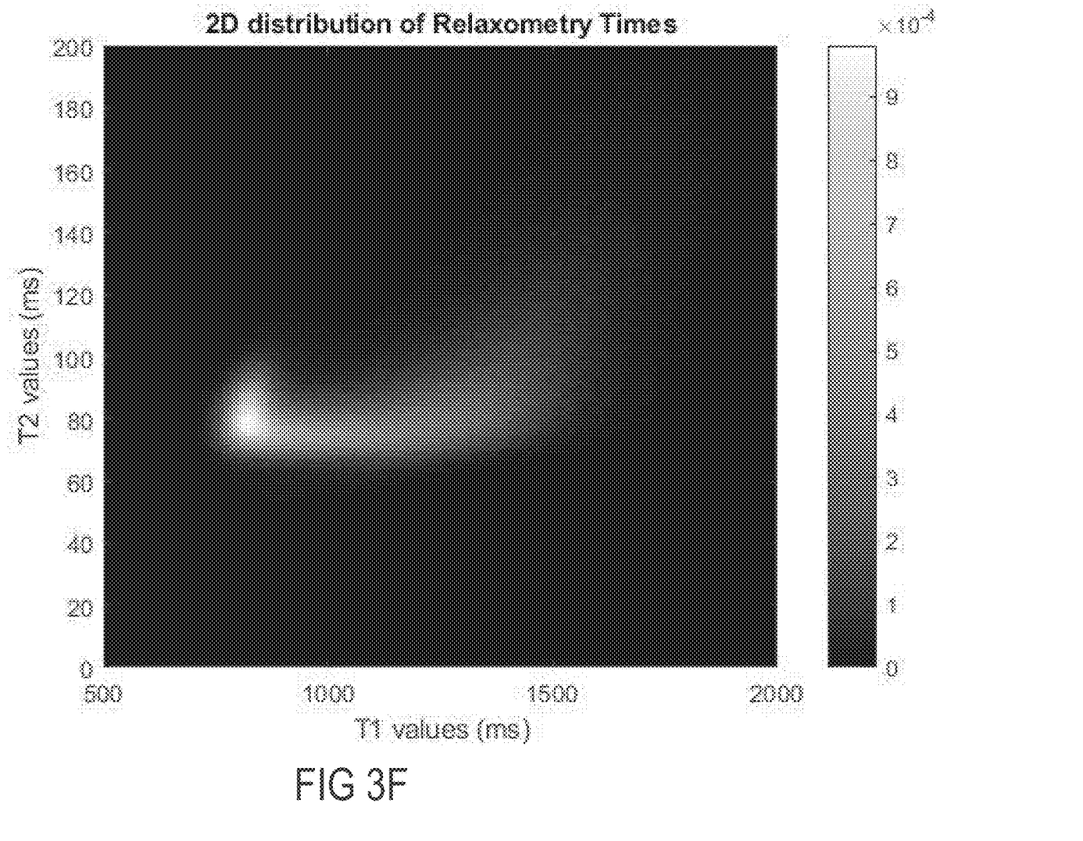
Figure 3G:
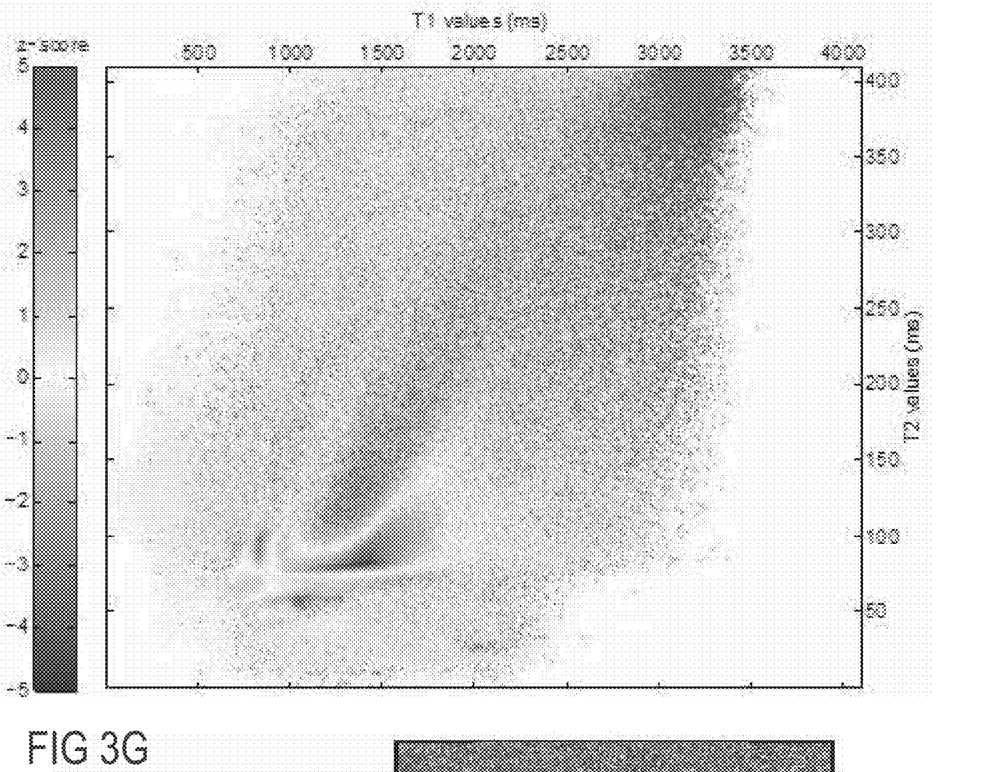

At step 106, the imaging system is configured for automatically performing a comparison of the previously obtained averaged joint histogram (see FIG. 3C) with a joint histogram (see FIG. 3F) obtained from a patient for said organ in order to help a specialist/physician to determine whether the patient organ comprises potentially pathologic tissue. For this purpose, the joint histogram of the patient is computed and normalized by the total organ volume as previously described and performed for each subject of the healthy cohort. In other words, steps 102, 103 and 104 are repeated for the patient as illustrated in FIG. 2. FIGS. 3D and 3E show for instance the T1 map and the T2 map obtained for the patient organ and which are used for creating the joint histogram presented in FIG. 3F. Subsequently, the imaging system is configured for calculating a z-score for the $i^{th}$ bin of the patient joint histogram according to the following formula:

$$z_i=(x_i-\mu_i)/\sigma_i$$

where $z_i$ is the z-score associated to the $i^{th}$ bin of the patient joint histogram, $x_i$ is the concentration of the patients $i^{th}$ bin and $\mu_i$ and $\sigma_i$ are the mean and the standard deviation previously obtained from the healthy cohort for that bin. For comparison purpose, the bins for the patient and the bins for the healthy cohort are the same. The resulting z-scores represent how much the concentration of a certain combination of tissue properties deviates from the concentration obtained for the healthy cohort and that is considered as normal. The z-score obtained from the averaged joint histogram of FIG. 3C and the joint histogram of FIG. 3F is presented in FIG. 3G.

Figure 3H:
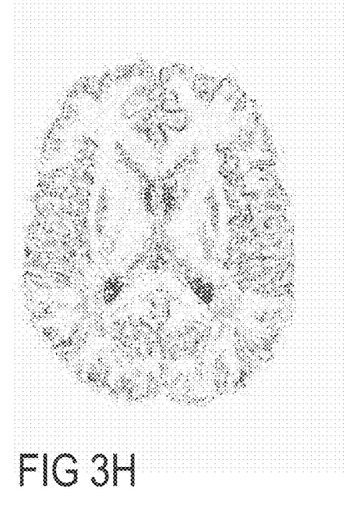
Figure 3I:
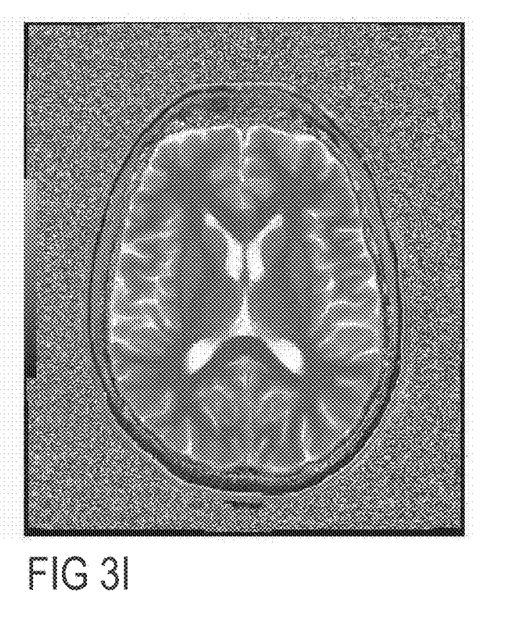

At step 107 and as illustrated in FIG. 3H, the imaging system is further configured for mapping the z-scores to the organ. Advantageously, said mapping provides a spatial visualization of the z-scores with respect to the organ. Indeed, since all calculations are performed in a joint histogram, they do not provide any spatial information, which is cured by the proposed mapping of the z-scores to the organ. To that end, the imaging system is configured for pairing all voxels in the image domain of the patient with a corresponding bin in the joint histogram domain according to the voxel intensity. The imaging system is further configured for assigning to each voxel the z-score from the bin it belongs to in order to build a z-score map. Indeed, each bin is also associated with a z-score that can be exploited to build said z-score map in the image domain by assigning to each voxel the z-score from the bin it belongs to. Preferentially, the resulting z-score map can then be overlaid on initial images of the patient (see for instance FIG. 3I) in order to point out organ regions which are characterized by a combination of tissue properties with an abnormal concentration, i.e. lower or higher than the healthy cohort, with a voxel level of detail as shown in FIG. 3H.

Compared to prior art techniques, the present invention proposes a comparison between tissue quantitative properties of a patient and the same tissue quantitative properties of a healthy cohort, wherein said comparison is performed within said joint, multi-dimensional histogram rather than in individual images or 1D histograms itself. Compared to prior art techniques, the present invention further provides a visualization of the z-score by a mapping of the z-scores from the joint histogram domain (or space) to images domain (or space) as previously described in connection with FIG. 3.

The proposed comparison in the joint histogram domain and the subsequent mapping to image domain provides several advantages compared to prior art techniques:
- it benefits of an easy implementation: for instance, the organ extraction is the only required pre-processing step and is thus independent from the accuracy of segmentation or registration algorithms as conventionally used;
- it facilitates a multivariate comparison in a joint domain, i.e. taking into account multiple tissue properties simultaneously, that theoretically improves sensitivity and specificity in the detection of pathological tissue;
- similar to voxel-based approaches, the outcome of the proposed method can be provided in the image domain thus provides spatial information although it is a histogram based algorithm and no spatial normalization is used.

FIGS. 3A-3I illustrate obtained images and graphs for a preferred embodiment of the invention wherein T1 and T2 quantitative maps from 24 healthy subjects have been used to compute the normative joint histogram as previously described. The resulting normative joint histogram (see FIG. 3C) is then used for conducting a subject-specific diagnosis which in the present case is a dementia diagnosis.

Clusters of white matter, grey matter and cerebrospinal fluid are identifiable from the normative joint histogram (see FIG. 3C) and patient joint histogram (see FIG. 3F). The z-scores in the joint histogram domain, shown in FIG. 3G, indicate bins where the concentration of the T1 and T2 combination of tissue properties of the patient's organ differs from the concentration obtained for the healthy cohort, corresponding therefore to brain abnormalities. The resulting spatial z-score map (see FIG. 3H) shows that these brain abnormalities are mainly linked to a lower concentration of grey matter and a higher concentration of cerebrospinal fluid, also known as atrophy, a typical radiological indication for dementia.

The present invention is not limited to T1 and T2 tissue properties. Indeed, the skilled person will recognize that other tissue properties can be exploited without departing from the concept of the invention, for instance by using proton density, $T2^*$, myelin-water fraction, magnetization transfer, diffusion, perfusion, etc. The method according to the invention is advantageously designed to be independent from the investigated tissue properties. Preferentially, and in contrast to joint histograms with two inputs (e.g., T1 and T2), the present invention proposes further an evaluation of multiple inputs, i.e. more than 2 inputs, combined together in a 3D or 4D or even higher dimensional joint histogram. The method according to the invention is preferably applied on quantitative maps rather than weighted images. According to preferred embodiments, other statistical parameters can be considered for describing the population norm (e.g. median, mode, percentile, among others) for the averaged joint histogram. The skilled man will also recognize that other parameters can be evaluated for detecting abnormal tissue rather than computing the z-score (e.g. t-score, distance from tolerance intervals, among others). While the present invention has been described in details with respect to an example of brain pathology, the claimed concept of the invention might be applied to other organs (e.g. knee cartilage, liver, pancreas, spine, prostate).

Preferentially, the present invention proposes additionally a blurring of the images used for creating the joint histogram or a blurring of the joint histograms after the skull stripping step for improving the result according to the central limit theorem: indeed, said blurring renders the data more normally distributed, increasing the validity of parametric statistical tests.

Finally, even if the previously described embodiments of the invention are based on quantitative information of MRI, the claimed method might use other imaging techniques that provide spatial quantitative information (e.g. PET, SPECT, CT, Ultrasound among others) or a combination of different imaging techniques (e.g. MR-PET). Of course, those of skill in the art will recognize that, unless specifically indicated or required by the sequence of operations, certain steps in the method described above may be omitted, performed concurrently or sequentially, or performed in a different order depending on the technique used for acquiring spatial quantitative information.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

The invention claimed is:

1. A method for automatically comparing organ tissue properties of a patient with corresponding organ tissue properties of a group of healthy subjects, the method comprising the following steps:
    determining a population norm for the organ tissue properties by:
        a) selecting at least two different tissue properties of the organ to be investigated;
        b) determining for each tissue property previously selected and for each subject of said group a quantitative tissue property map;
        c) for each subject of the group, calculating a joint histogram from all the quantitative tissue property maps obtained for said subject;
        d) normalizing each previously calculated joint histogram;
        e) determining an averaged joint histogram by averaging the normalized joint histograms across all subjects of the healthy group, wherein said averaged joint histogram defines said population norm;
    automatically performing a comparison of the averaged joint histogram with a patient joint histogram obtained for the organ tissue properties of the patient, wherein the patient joint histogram is obtained through the following steps:
        b1) determining for each tissue property selected in step a) a quantitative tissue property map for the patient organ; and
        c1) calculating a joint histogram from all the quantitative tissue property maps obtained for the organ of said patient;
        d1) normalizing the previously calculated joint histogram; and
    wherein the comparison is obtained by calculating a statistical deviation of values of the patient joint histogram with respect to values of the averaged joint histogram and mapping the statistical deviation to the patient organ.

2. The method according to claim 1, wherein calculating the joint histogram comprises:
    determining for each subject of said group and for each quantitative tissue property map obtained for said subject a total volume of said organ;
    dividing said total volume into voxels wherein each voxel is associated to a quantitative value for the tissue property of the quantitative tissue property map;
    dividing the quantitative values of each of the quantitative tissue property maps into bins;
    for each bin, counting the number of voxels lying within said bin in order to create the joint histogram.

3. The method according to claim 2, wherein the step of normalizing each previously calculated joint histogram comprises dividing each bin of the joint histogram by the total number of voxels comprised within the total volume of said organ.

4. The method according to claim 1, wherein the step of normalizing each previously calculated joint histogram comprises dividing each bin of the joint histogram by the total number of voxels comprised within the total volume of said organ.

5. The method according to claim 1, wherein the calculated statistical deviation is a z-score calculated from the averaged joint histogram and the patient joint histogram, and the method comprises mapping the z-score to the patient organ.

6. The method according to claim 5, wherein the step of mapping the z-score to the patient organ comprises:
    pairing all voxels in the image domain of the patient organ with a corresponding bin in the patient joint histogram domain according to voxel intensity; and
    assigning to each voxel the z-score from the bin it belongs to in order to build a z-score map in the image domain.

7. An imaging system configured for automatically comparing organ tissue properties of a patient with corresponding organ tissue properties of a group of healthy subjects, the imaging system comprising:
    a processor and an accessible memory, the imaging system being configured to:
    determine a population norm for said organ tissue properties by:
        a) selecting at least two different tissue properties of the organ to be investigated;
        b) determining for each tissue property previously selected and for each subject of said group a quantitative tissue property map;
        c) for each subject of the group, calculating a joint histogram from all the quantitative tissue property maps obtained for said subject;
        d) normalizing each previously calculated joint histogram; and
        e) determining an averaged joint histogram by averaging the normalized joint histograms across all subjects of the healthy group, wherein said averaged joint histogram defines said population norm;
    automatically perform a comparison of the averaged joint histogram with a patient joint histogram obtained for the organ tissue properties of the patient, wherein, for determining the patient joint histogram, the imaging system is configured for:
        b1) determining for each tissue property selected in step a) a quantitative tissue property map for the patient organ; and
        c1) calculating a joint histogram from all the quantitative tissue property maps obtained for the organ of said patient;
        d1) normalizing the previously calculated joint histogram; and
    and wherein the comparison is obtained by calculating a statistical deviation of values of the patient joint histogram with respect to values of the averaged joint histogram and mapping said statistical deviation to the patient organ.

8. The imaging system of claim 7, configured for calculating the joint histogram by:
    determining for each subject of said group and for each quantitative tissue property map obtained for said subject a total volume of said organ;
    dividing said total volume into voxels wherein each voxel is associated to a quantitative value for the tissue property of the quantitative tissue property map;
    dividing the quantitative values of each of the quantitative tissue property maps into bins;
    for each bin, counting the number of voxels lying within said bin in order to create the joint histogram.

9. The imaging system of claim 7, configured for dividing each bin of the joint histogram by a total number of voxels comprised within the total volume of said organ in order to normalize each previously calculated joint histogram.

10. The imaging system of claim 7, configured for calculating a z-score from the averaged joint histogram and the patient joint histogram, and mapping the z-score to the patient organ.

11. A non-transitory computer-readable medium encoded with executable instructions that, when executed, cause one or more imaging systems to perform the method according to claim 1.

\* \* \* \* \*